July 30, 1963  R. F. DE MARCO ETAL  3,099,332
ELEVATING SHELF FOR STOCK BIN SERVICING TRUCK
Filed May 3, 1961  6 Sheets-Sheet 1

INVENTORS.
ROBERT F. DE MARCO
HENRY W. HEIN,
BY
*John H. Lennod*
*their* ATTORNEY.

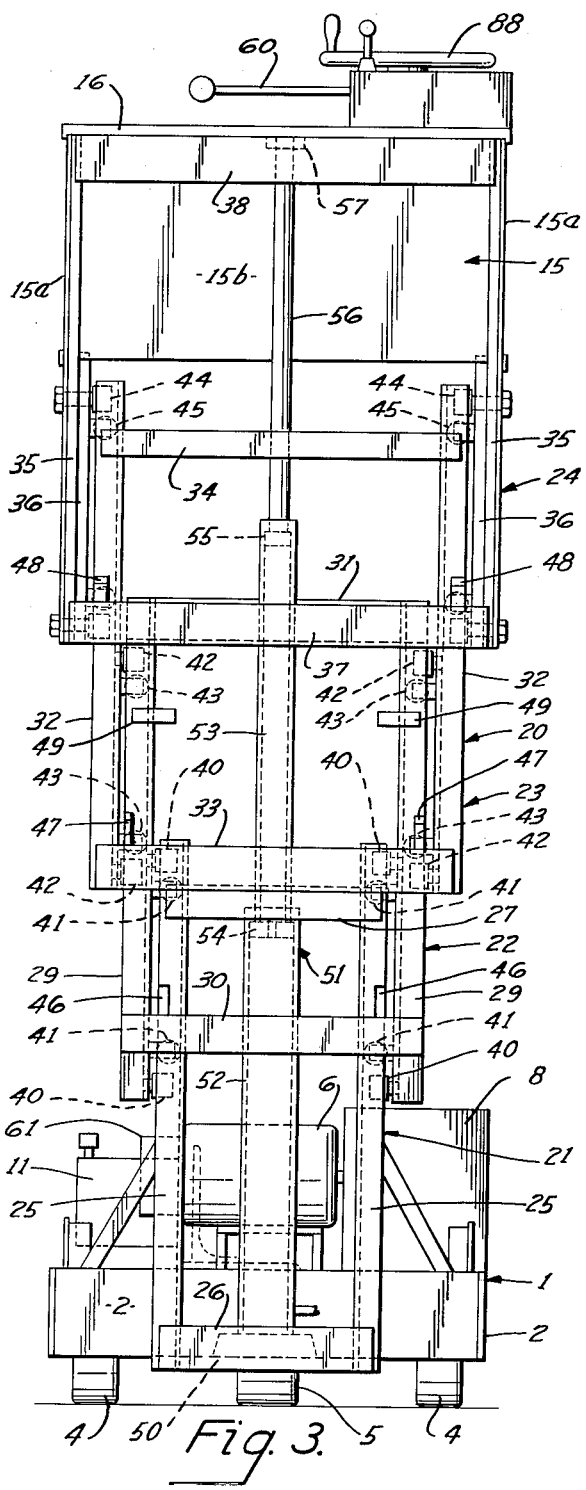
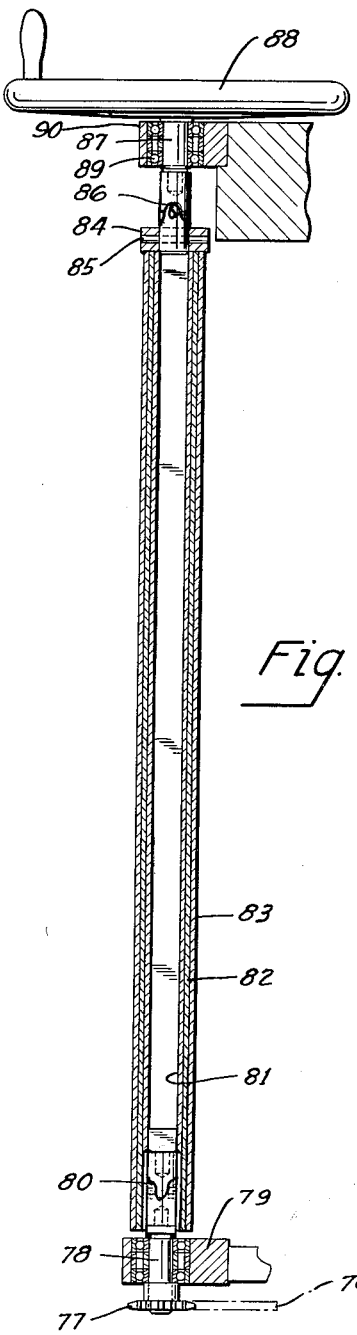

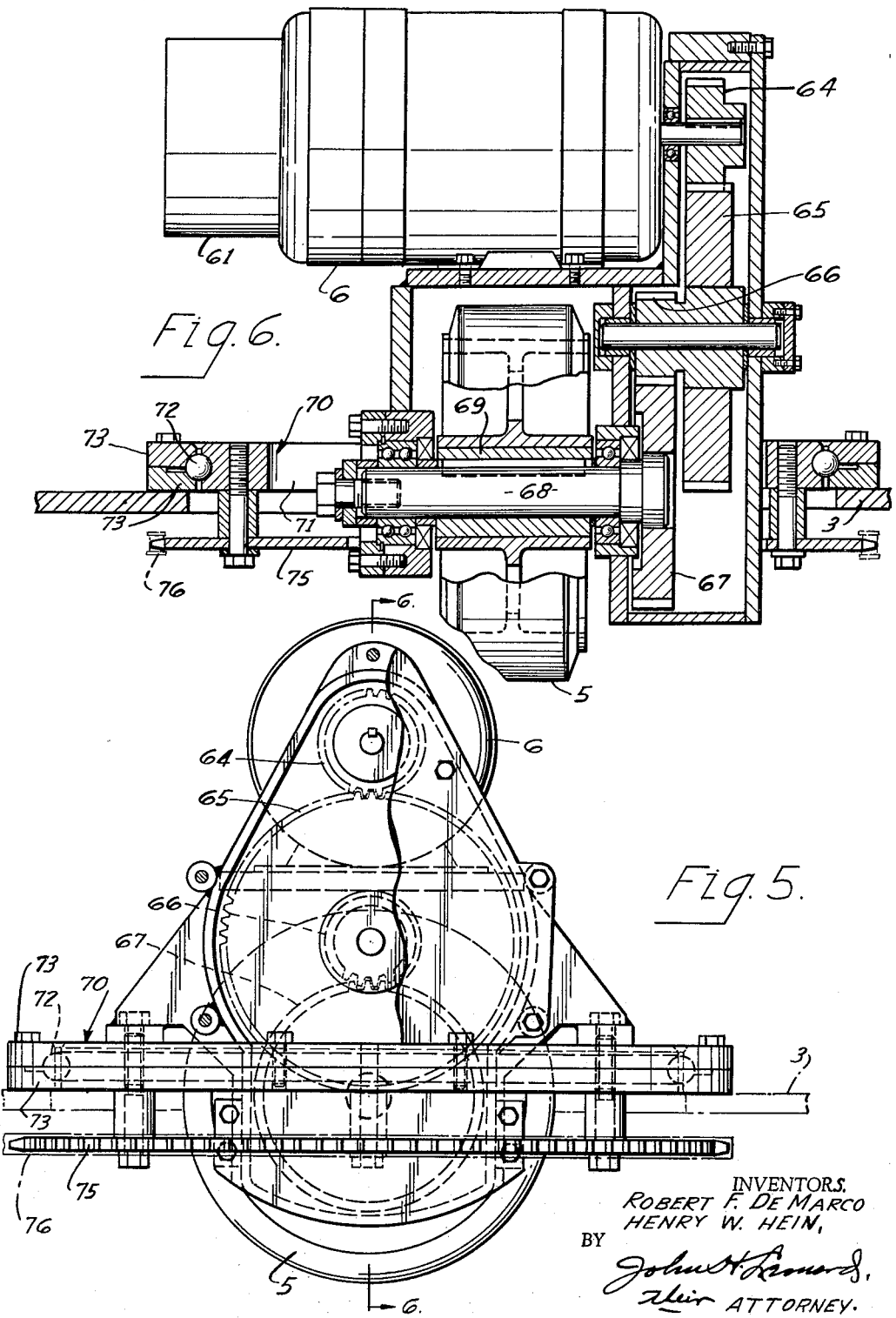

July 30, 1963 R. F. DE MARCO ETAL 3,099,332
ELEVATING SHELF FOR STOCK BIN SERVICING TRUCK
Filed May 3, 1961 6 Sheets-Sheet 5

INVENTORS.
ROBERT F. DE MARCO
HENRY W. HEIN,
BY
their ATTORNEY.

July 30, 1963    R. F. DE MARCO ETAL    3,099,332
ELEVATING SHELF FOR STOCK BIN SERVICING TRUCK
Filed May 3, 1961    6 Sheets-Sheet 6

INVENTORS.
ROBERT F. DE MARCO
HENRY W. HEIN,
BY
John H. Leonard,
Their ATTORNEY.

United States Patent Office 3,099,332
Patented July 30, 1963

3,099,332
ELEVATING SHELF FOR STOCK BIN SERVICING TRUCK
Robert F. De Marco, Mentor, and Henry W. Hein, Chardon, Ohio, assignors to The Heifred Corporation, Willoughby, Ohio, a corporation of Ohio
Filed May 3, 1961, Ser. No. 107,492
6 Claims. (Cl. 182—14)

This invention relates to a servicing truck having an elevating shelf and particularly to a truck, for servicing bins, having its elevating shelf and an operator's platform which are lifted and lowered as a unit so as to afford the operator easy access to equipment and bins above his normal reach from the floor level.

Various types of trucks for this purpose have been provided heretofore and generally have been arranged with a wheeled chassis and an upright mast which extends above the level of the shelves in all elevated positions of the shelf. In the prior trucks, the mast is either at one end or near the longitudinal center of the chassis.

Generally an elevator platform is mounted on the mast for movement relative thereto to different raised and lowered positions. For convenience in servicing bins, a shelf on which the articles lifted from the bins by an operator on the platform can be placed, is arranged at the forward end of the platform. Usually the shelf, or both the shelf and the operator's platform, are positioned forwardly of the front end of the chassis and front wheels, and the resultant weight overhanging the front wheels necessitates a longer chassis or special weights on the truck chassis for counterbalancing the overhanging load. Consequently, the turning radius is longer than otherwise would be necessary. Any slight increase in chassis length is objectionable, considering the narrow width of the aisles between the bins which the truck is to service. Another object is that, when the truck is at the dead end of an aisle of servicing bins, the operator is confined between end bins and the mast. Due to the close lateral clearance of the side bins, he cannot escape from the platform except by climbing through or over the mast, a difficult and hazardous maneuver.

Again, where the lateral branch aisles of bins are in line with each other in a direction transversely of the main aisle, prior trucks of this type cannot be backed from a position, shelf foremost, in one lateral aisle across the main aisle and into the aligned lateral aisle into a position for servicing the bins of the aligned aisle. This is because, in such operation, the mast is between the operator's platform and the end bins of the aligned aisle. Furthermore, the rear end of the truck, when at the dead end bins of the aligned lateral aisle prevents the truck from approaching the end bins close enough to be reached readily by the operator even though he should try to reach through the mast equipment.

In accordance with the present invention, these disadvantages of the prior trucks are overcome by the provision of a truck having a vertically extensible and contractible mast at one end, with an elevator carried by the mast and extending from the mast back over the truck chassis toward the opposite end of the chassis, with a shelf on the elevator overhanging the truck chassis and with an operator's platform at the opposite end of the chassis from the mast.

Combined with this feature is the specific feature of a mast made in telescopic sections which do not protrude above the level of the shelf, and hence permit ready access to the shelf over the mast at the mast end of the shelf. As a result of this arrangement, there is no overbalanced load due to the operator's weight or to the load on this shelf, as the shelf lies within the fore and aft limits of the wheels, and the operator's weight is more or less counterbalanced by the mast and elevator equipment at the end of the chassis which is opposite from him. Consequently, a much shorter chassis and wheel pattern can be used with the advantage of a very short turning radius.

The present truck, being short and easily turned, and with its mast below the level of the shelf, can be run forwardly into a lateral aisle from a main aisle so as to dispose the shelf against the dead end bins. In this position, the operator can readily reach into the dead end bins for servicing them. The truck can be backed out of the lateral aisle directly into the opposite aligned lateral aisle into a position in which the operator's platform is practically against the dead end bins of the aligned aisle, wherefore he can service the bins readily with the top of the shelf readily accessible. His operation is in no case interfered with by the mast which preferably is always below the level of the shelf, or at least does not extend an objectionable distance thereabove.

Due to the shortness of the truck and wheel pattern, he can readily service end bins by reaching across the shelf when it is between him and the end bins, and by reaching into the end bins and turning on his platform and placing the articles from the bins on the shelf or in the bins from the shelf.

In those instances where turning of the truck is required, this can readily be effected in the main aisle due to the very short turning radius. The operator cannot be trapped in event of failure of operation of the power mechanisms. He can step off his platform directly onto the ground if the platform is disposed away from the end bin. On the other hand, if it is disposed toward the end bin then he can merely step up onto the shelf, walk across the shelf and then step off the other end. He is not confronted with the necessity of finding his way through the various parts of the mast, as in prior mechanisms.

Various other specific objects and advantages will become apparent from the following description wherein reference is made to the drawings in which:

FIG. 3 is a front end elevation of the truck illustrated in FIG. 2;

FIG. 5 is a side elevation of the structure illustrated in FIG. 4;

FIG. 6 is a vertical sectional view taken on the line 6—6 in FIGS. 4 and 5;

FIG. 7 is an enlarged fragmentary view, partly in vertical section, of the steering mechanism of the present invention;

Figure 2:
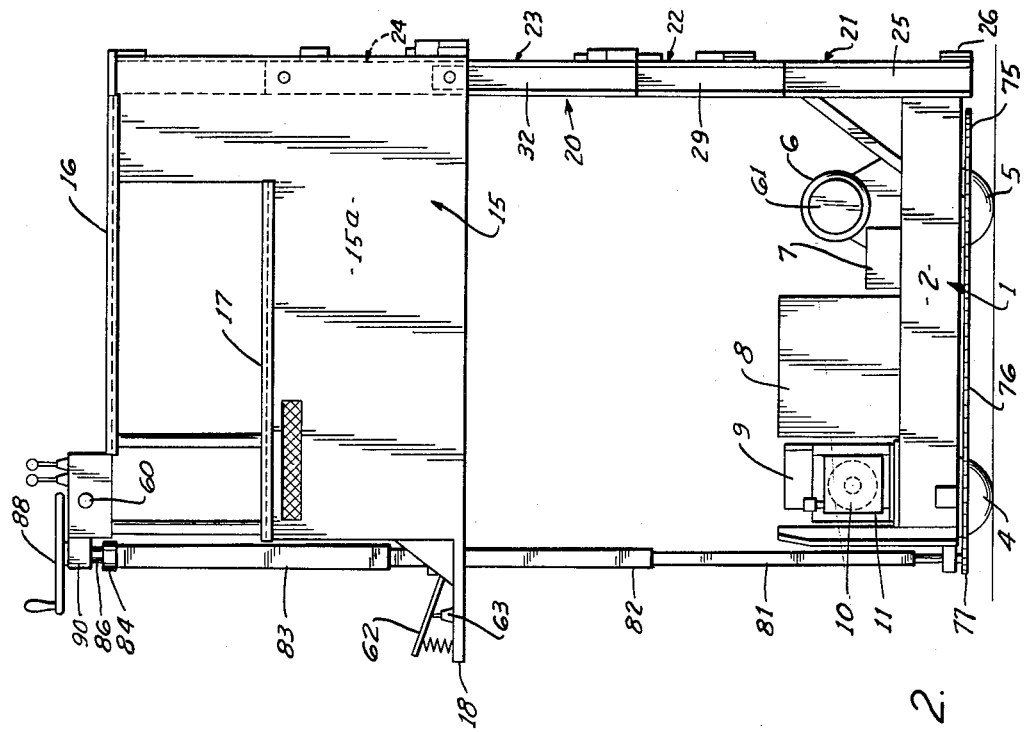
FIG. 2 is a side elevation similar to FIG. 1, but showing the shelf in maximum raised position.
Figure 1:
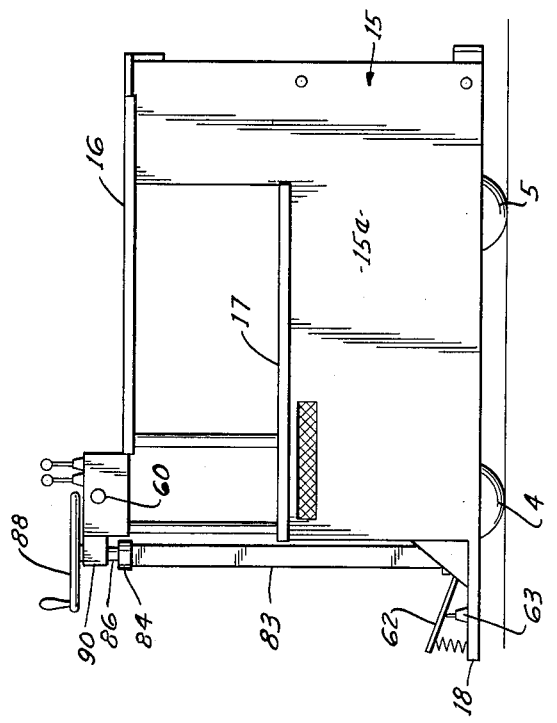
FIG. 1 is a side elevation of a truck embodying the principles of the present invention, and showing the parts thereof with the shelf in lowered position.

Referring to the drawings, the truck comprises a chassis including a frame 1 having longitudinal and transverse sills 2 and a metal plate floor 3 rigidly secured thereto. The specific structure of the frame is relatively unimportant.

Mounted at one end of the frame are the non-dirigible wheels 4 which generally are at the so-called rear of the truck. A driving steerable wheel 5 is provided near the opposite end of the truck and is driven through conventional reduction gearing by an electric motor 6. Mounted on the chassis is a suitable control 7 which may be operated remotely as will later be described. A battery 8, and a battery charger 9, which may be plunged into a conventional 110 volt electrical outlet for recharging the battery when the truck is not in use, are provided. An electrically operated hydraulic pump and motor combination 10, with a tank 11 for fluid, is provided. The pump supplies fluid pressure to the hoist or jack of the truck, under the control of suitable remote control valves of conventional type, for selectively lifting and lowering an elevator frame.

Mounted on the chassis 1 for vertical movement is an elevator frame 15 formed in part by side panels 15a and a front panel 15b. At its upper surface, it carries a loading shelf 16 and spaced therebeneath a supplemental shelf 17 and operator's platform 18. The frame 15 is mounted on a telescopic mast, indicated generally at 20. The mast 20 comprises a plurality of sets of telescoped sections, indicated at 21, 22, 23, and 24. The section 21 is mounted in fixed upright position on the chassis and comprises a pair of rigid upright members 25 secured in fixed position to the chassis at one end thereof and reinforced by lower and upper cross members 26 and 27, respectively, so as to form a rigid structure.

The members 25 are preferably channels which open in the outboard direction laterally of the chassis and thereby provide guideways for the next adjacent section 22 thereabove. The next section 22 comprises upright members 29 which are channels similar to the members 25. These channels are secured together in spaced relation and also open in the outboard direction. They are connected together in fixed position transversely by suitable lower and upper cross members 30 and 31, respectively. The section 23 comprises upright members 32 which are channel-shaped and open outwardly in the outboard direction. The members 32 are secured together by lower and upper cross members 33 and 34, respectively. The uppermost section 24 comprises rigid upright members 35 with reinforcing members 36. The members 35 are connected by lower and upper cross members 37 and 38, respectively. The upper section is a part of the elevator frame.

As shown in FIG. 3, beginning at the bottom section 21, each section is slightly wider thereabove than the one immediately beneath, so that its upright members lie just outside the upright members of the one therebeneath, thus providing a telescopic relation.

In order to support the members for movement to extended and retracted positions with a minimum of friction and without binding, suitable rollers are provided. Each upright member 29 is provided with upper and lower rollers 40 having their axes extending transversely of the mast and upper and lower rollers 41 having their axes extending forwardly and rearwardly of the mast. The rollers 40 roll along the sides of the channel member 25 and the rollers 41 roll along the base of the channel member 25. Correspondingly, each member 32 of the section 23 has upper and lower rollers 42 with their axes extending transversely of the mast and upper and lower rollers 43 with their axes extending forwardly and rearwardly of the mast, these rollers cooperating with the member 29 in like manner to the rollers 40 and 41 with respect to the members 25.

The juxtaposed members 35 and 36 of the section 24 are provided with upper and lower rollers 44, their axes extending transversely of the mast, and upper and lower rollers 45 with their axes extending forwardly and rearwardly of the mast. These rollers cooperate with the members 32.

The upright members 25 have stops 46 which engage the cross member 30 of the section 22 to limit the upward movement thereof.

The members 29 have stops 47 which engage the member 33 of the section 23 so as to arrest its upward movement. The members 32 have stops 48 which engage the member 37 of the section 24 and thus arrest its upward movement.

To arrest the members in the proper retracted position, the member 30 of the section 22 engages the member 26 of the section 21. The members 29 have lugs 49 which are engaged by the cross member 34 of the members 32 of section 23, thus limiting the relative downward movement. The member 38, in turn, engages the members 34 to limit the downward movement of the members 35 and 36 of section 24.

To permit relative passage of the member 33 with respect to the member 30, and the member 37 with respect to the member 33, the member 33 is spaced forwardly from the plane of the member 30 and the member 37 is spaced forwardly from the plane of the member 33.

In order to raise and lower the elevator frame 15, a suitable plate 50 is secured at the bottom of the members 26 and a telescopic piston and cylinder assemblage 51 is mounted in upright position thereon. This assemblage comprises a cylinder 52 having its lower end resting on and secured to the plate 50. Mounted within this cylinder is a combined piston and cylinder 53 having a piston head 54 at one end and an axial passage for fluid. Mounted in the axial passage of the combined piston and cylinder 53 is a piston 55 having a rod 56. The upper end of the rod 56 is securely fastened to a member 57 on the elevator frame. By admitting fluid pressure from the pump 10 to the lower end of the assemblage 51, the frame 15, and thereby the shelves 16 and 17, can be raised or lowered, as desired.

For propelling the truck, the wheel 5 is driven by the motor 6 which is remotely controlled from the operator's platform 18 through an electric switch control device 7 of any conventional type. The device 7 responds to a lever 60, mounted on the elevator frame in a position readily accessible to the operator on the platform 18. Swinging of the lever in opposite directions, causes the control device 7 to reverse the motor and thus the direction of travel of the truck. The degree of movement of the lever in the selected direction determines the motor speed in that direction. The type of control forms no part of the invention.

Figure 4:
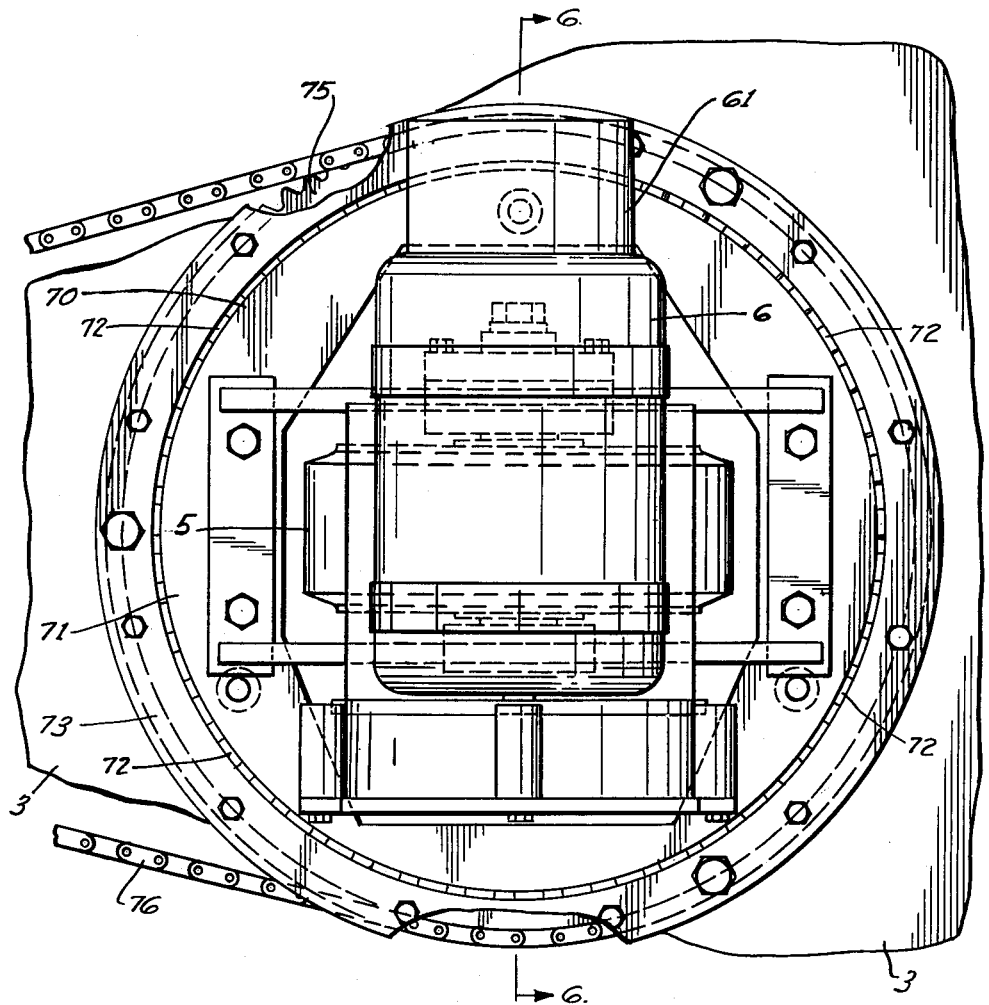
FIG. 4 is an enlarged top plan view of the steerable power driven wheel assemblage of the truck.

As best illustrated in FIGS. 4 through 6, the motor 6 is equipped with a conventional magnetic brake 61 which is normally spring applied, but which is held released upon energization. A foot lever 62 is provided on the operator's platform 18. The foot lever operates a conventional limit switch 63 which, when the lever 62 is depressed, energizes the solenoid which then releases the brake.

For driving the wheel 5, the motor is provided with a suitable driving gear 64 which, through reduction gears 65 and 66, drives the driven gear 67. The gear 67 is fixedly connected to a shaft 68 for rotation therewith, and the shaft 68 is connected fixedly to the hub 69 of the wheel 5. In order that the wheel be readily steerable, the wheel, motor, and transmission gears are mounted on a support 70 which is connected to the frame of the truck for rotation about an upright axis. The support 70 is in the form of a ring which forms the inner race of a set of ball bearings 72. Two outer plates 73 are bolted together in face to face relation and are secured by bolts 74 to the truck floor 3. The plates 73 form the outer race for the ball bearings 72. Thus the support is antifrictionally mounted for rotation about an upright axis which axis preferably extends through the horizontal axis of the wheel 5 midway between the ends of the wheel 5.

In order to steer the truck, a sprocket 75 is fixedly connected to the plates 71 and is driven by a chain 76. The chain, in turn, is driven by a sprocket 77 at the end of the truck opposite the mast 20.

As best illustrated in FIG. 7, the sprocket 77 is carried on a suitable shaft 78 mounted in suitable roller bearings in a housing 79 which is secured in fixed position on the chassis. The shaft 78 is connected by a universal joint connection 80 to the innermost sleeve 81 of an extensible steering shaft. The steering shaft comprises three sleeves including a sleeve 81, 82, and 83 which are telescopingly arranged with respect to each other. The sleeves are square or out of round in external cross section and fit into each other snugly so that rotation of one necessitates concurrent rotation of the other while permitting the sleeves to slide endwise to extended and retracted positions relative to each other.

The sleeve 82 connects the sleeve 81 to the sleeve 83. The sleeve 83, in turn, is fixedly connected to a suitable collar 84 which is secured by a pin 85 to a universal joint connection 86. The connection 86, in turn, is keyed to a suitable steering post 87 which is rotatable with a steering wheel 88. The post 87 is mounted in suitable bearings 89 in a support 90 which is secured in fixed position on the elevator frame so as to support the wheel 88 in a position readily accessible to the operator. Thus, in all raised and lowered positions of the operator's platform 18, the operator, while standing on the platform 18, can drive the truck forwardly and rearwardly, steer it, and control its speed in the selected direction, and stop and brake it when desired.

Figure 7A:
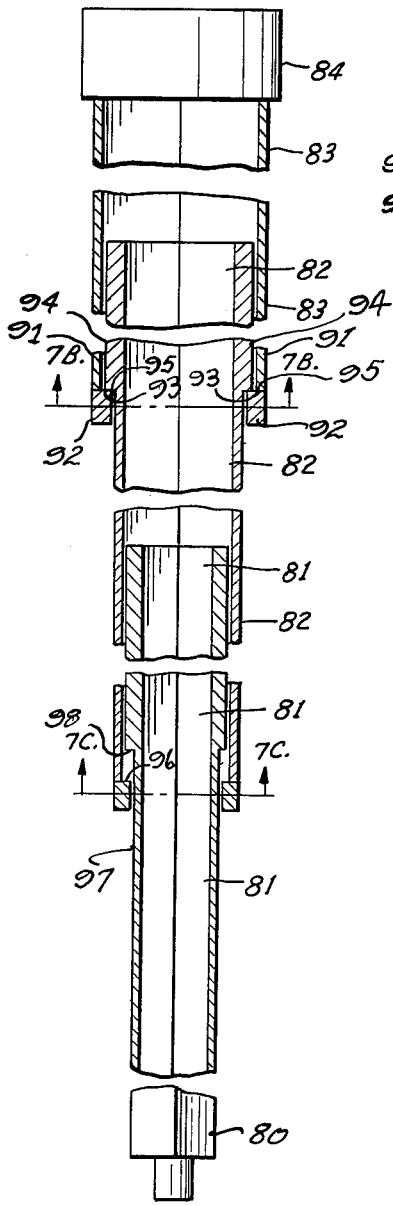
FIG. 7A is a fragmentary view similar to FIG. 7, but on a larger scale than FIG. 7, showing the connections between the telescopic sleeves of the steering shaft and is taken on lines 7A—7A in FIGS. 7B and 7C.
Figure 7B:
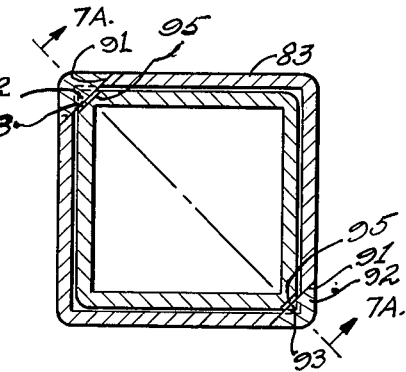
FIGS. 7B and 7C are cross sectional views taken on lines 7B—7B and 7C—7C, respectively, on FIG. 7A.
Figure 7C:
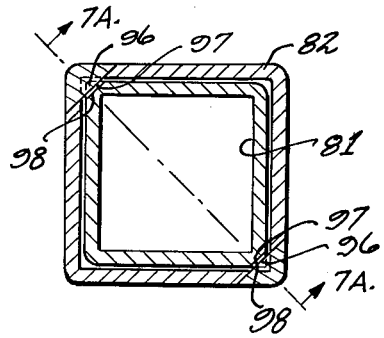

As best illustrated in FIGS. 7A through 7C, at the lower end of the sleeve 83, two of its diagonally opposite corners 91 are ground off to expose therethrough the interior of the tube 83. Welding metal 92 is bonded into the resultant space and partially into the sleeve at the ground off corners to form interior shoulders 93. The sleeve 82 is ground off on opposite corners 94 at a level below its upper end, thus leaving an overhanging shoulder 95 at each corner overhanging the shoulders 93 of the sleeve 83. These shoulders engage to lift the sleeve 82 by the sleeve 83 and to prevent their separation axially in the extending direction.

The lower end of the tube 82 is treated with welding material similarly to the lower end of the tube 83 to provide a shoulder 96. The sleeve 81 is ground off at two opposite corners, as at 97, to provide shoulders 98 complementary to the shoulders 96, to prevent separation of the sleeves 82 and 81 axially in the extended direction. This arrangement also has the advantage that the inwardly disposed weld metal may engage the ground off corner edges for guiding the tubes at widely spaced locations so as to reduce any tendency for them to bind during extension and retraction.

The elevator frame 15 is so arranged that the panels 15a and 15b laterally enclose and conceal the mast 20, and the various power and drive mechanisms when the platform 18 is fully lowered.

Figure 8:
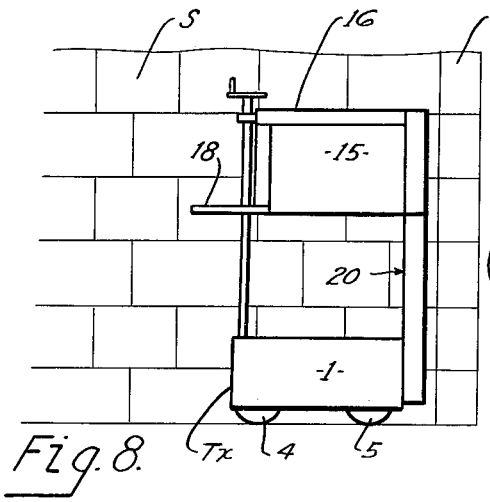
FIG. 8 is a diagrammatic side elevation showing the truck in relation to bins of an aisle.
Figure 9:
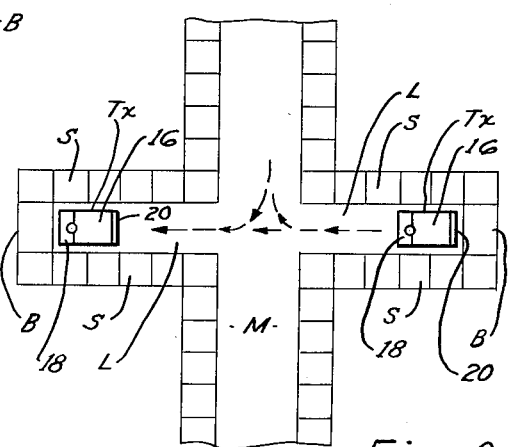
FIG. 9 is a diagrammatic top plan view showing the main aisle and lateral aisles, and illustrating the manner in which the truck may be maneuvered therein.

Referring next to FIGS. 8 and 9, certain advantages of the truck are illustrated. FIG. 8 shows the truck $T_x$ of the present invention at the end of a lateral aisle of bins formed by side bins S and end bins B. As noted, with this truck, the truck can be moved mast end foremost in the aisle L until the mast 20 is substantially against the end bins B. In this position the operator is on the platform 18 and can reach forwardly over the shelf 16 for servicing the end bins B readily. Likewise, he can service the side bins S along on each side. In event of any failure of the mechanism he can readily step off the platform 18 and walk out of the aisle L. At the same time if the truck is spaced to the left of the end bins B in the aisle L, and it becomes necessary for him to step between the front end of the truck and the end bins, he can step up onto the shelf 16 and down the front of the mast without having to crawl through or around the parts of the mast and hoist.

Again, as in FIG. 9, assuming the bins are arranged with a main aisle M and two lateral aisles L which are arranged at opposite sides of the main aisle and in alignment endwise with each other, it is apparent from FIG. 9 that the truck may be driven into the right hand lateral aisle L with the mast foremost and the platform 18 to the rear and, in this position, the operator can service all the bins. Then, without turning the truck, he can back it out of the right hand lateral aisle into the left hand aisle, thus dispoisng his platform 18 adjacent the end bins B in the left hand lateral aisle L. In this position, he can readily service the end bins, as well as the side bins, of the left hand lateral aisle. If he desires to turn the truck around, he can do so by backing out of the right hand lateral aisle, and down the main aisle M a very short distance, then turning and proceeding mast end foremost into the left hand lateral aisle. In many cases the main aisle is sufficiently wide that, considering the very short turning radius, the truck can be turned around in the intersection without backing along the main aisle.

As mentioned, due to the overhang of the shelf 16 relative to the chassis 1, the chassis can be extremely short, thus providing for the very short turning radius from the rearmost corner of the platform 18 and the point of turning about one of the front wheels 5.

Figure 10:
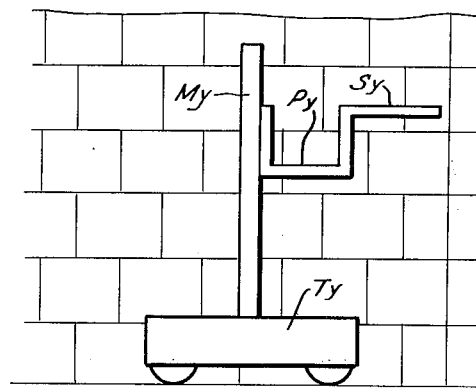
FIGS. 10 and 11 are diagrammatic illustrations, similar to FIG. 8, showing respectively two prior types of trucks used for the same purpose, in relation to the bins.
Figure 11:
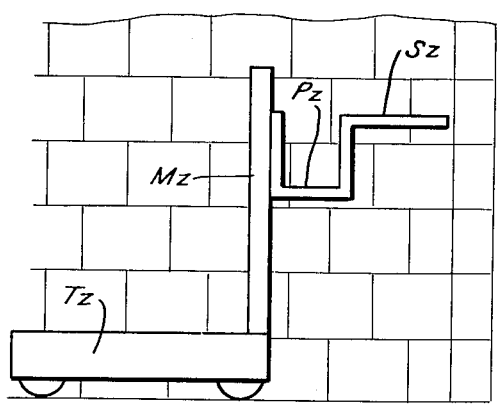

Referring next to FIGS. 10 and 11, these figures represent diagrammatically prior types of trucks of this character.

In FIG. 10, the truck is one in which the mast $M_y$ is at the longitudinal center of the truck $T_y$. The platform $P_y$ is forwardly of the mast and the shelf $S_y$ is forwardly of the platform $P_y$. It is apparent that, with this structure, when servicing the end bins $B_y$, the operator is between the mast $M_y$ and the shelf $S_y$. Thus he is blocked and cannot escape from the platform except by crawling through or over the mast, a complicated and hazardous maneuver. Furthermore, since the shelf overhangs the front wheels, the heavy load on the shelf tends to unstabilize the chassis and cause it to rock about the front wheels. This necessitates a considerably longer chassis, for counterbalance, than would otherwise be required.

In FIG. 11, a similar truck $T_z$ is shown with the exception that the mast $M_z$ is at the forward end, and the operator's platform $P_z$ and the shelf $S_z$ both overhang the front wheels. This type is open to the same objection as the structure shown in FIG. 10. Furthermore, it requires an even longer chassis in order to counterbalance the overhanging weight of the operator and shelf.

Figure 12:
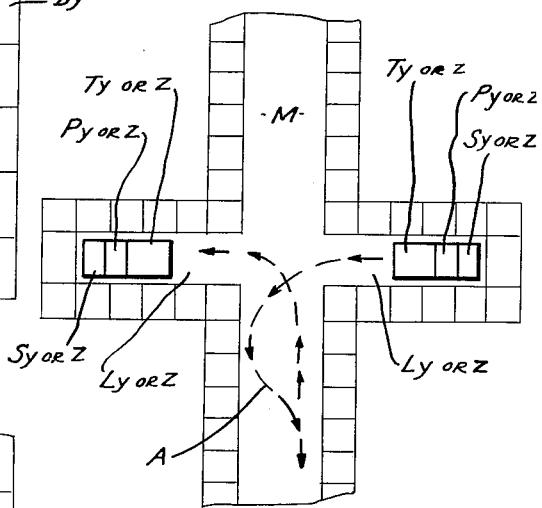
FIG. 12 is a view similar to FIG. 9 illustrating the manner in which the trucks of the prior art of FIGS. 10 and 11 must be maneuvered in order to service the bins at diametrically opposite aligned lateral aisles.

Referring to FIG. 12, with either of the trucks illustrated in FIG. 10 or 11, it is apparent that the operator must enter a lateral aisle $L_y$ or $L_z$ with the shelf $S_y$ or $S_z$ foremost. Otherwise, he would have to reach from the platform $P_y$ through the mast and its cables or hoist mechanisms, for servicing the end bins. Accordingly, the truck cannot be backed from one lateral aisle $L_y$ and $L_z$ to the opposite aligned lateral aisle for servicing end bins in the latter. Instead, it must be driven into the main aisle M, turned around and run shelf end first into the opposite aligned lateral aisle. Since it has a long chassis, it must be backed, somewhat as indicated by the arrows A in FIG. 12, to dispose it at the side of the main aisle opposite to the left-hand lateral aisle in which it is to be driven, then down that side of the main aisle, and finally from it into the left lateral aisle. Quite often this too requires more maneuvering than the simple backing and turning illustrated. It must be remembered that all main and lateral storage aisles are made as narrow as possible in order to conserve space. Usually the minimum width is greater than desired because of limitations imposed by the length, arrangement, and turning radii of the servicing trucks.

It is apparent, therefore, that with this arrangement shown and described, considerable advantages in stability and maneuverability and safety of the operator are provided.

Having thus described our invention, we claim:

1. An elevating shelf servicing truck comprising a self-propelled, steerable, wheeled chassis, an elevator mast at one end thereof, an elevator frame mounted on the mast for movement to raised and lowered positions relative to the chassis, said elevator frame having one of its ends connected to the mast, said elevator frame extending from said mast toward the opposite end of the chassis and terminating at its other end near said opposite end of the chassis, an operator's platform carried by the elevator frame at said other end of the chassis, propelling power means including a prime mover and a power source for propelling the chassis, said propelling power means being disposed on the chassis between the mast and opposite end of the chassis, lifting power means for raising and lowering the elevator platform, control means including manually operable control elements for controlling the lifting power means and the propelling power means, steering means for steering the chassis, said control elements and steering means being carried by the elevator frame for lifting and lowering therewith in a position accessible to an operator on the platform in raised and lowered positions of the elevator frame, said control elements being operable in said raised and lowered positions of the elevator frame, a service shelf carried by the elevator frame, said shelf being disposed between said mast and platform and being in overlying relation to the propelling power means when the elevator frame is in lowered position, and said operator's platform being offset, endwise of the chassis in a direction away from the mast, from the shelf and propelling power means, and positioned below the upper level of the shelf and propelling power means a distance such that when the elevator frame is in lowered position, the operator's platform is below the level of the top of the propelling power means and near to the ground level.

2. The truck according to claim 1 wherein said prime mover is an electric motor and said power source is a battery connected to said motor.

3. The truck according to claim 2 wherein said lifting power means includes an electrically driven hydraulic pump and a hydraulic fluid tank connected thereto, said pump and tank being carried on the chassis between the ends thereof and below the lowermost level of the shelf.

4. The truck according to claim 1 wherein said platform extends, in said direction away from the mast, beyond the opposite end of the chassis.

5. The truck according to claim 1 wherein said frame comprises front members connected to the mast at said one end of the chassis, side panels connected to the front members and extending rearwardly from the front members to the opposite end of the chassis, said panels being spaced apart laterally of the chassis a distance substantially equal to the width of the chassis and the space between the panels being open from the bottom of the panels upwardly a sufficient distance so that, as the frame is moved to its lowered position, the prime mover and power source are received between the side panels, said operator's platform is near the level of the lower edges of the panels, the shelf is connected to the panels and extends horizontally from one panel to the other and substantially from said one end of the chassis to the other, and, in the lowermost position of the frame, the panels extend from near the ground level upwardly above the upper level of the prime mover and source, and the shelf is above the upper level of the prime mover and source in the lowermost position of the frame.

6. A truck according to claim 1 wherein the power means for the elevator frame includes a hydraulic jack which includes a plurality of relatively telescoped cylinders and a piston and rod reciprocable in one of said cylinders, and said jack is extensible and contractible by relative axial movement of the cylinders relative to each other and of the piston relative to its associated cylinder, and said jack terminates at its upper end close to, or below, the level of the shelf in all positions of the jack.

References Cited in the file of this patent

UNITED STATES PATENTS

| | | |
|---|---|---|
| 2,035,294 | Black | Mar. 24, 1936 |
| 2,506,860 | Dimon | May 9, 1950 |
| 2,635,014 | Getty et al. | Apr. 14, 1953 |
| 2,826,280 | Troche | Mar. 11, 1958 |
| 2,972,394 | Grant | Feb. 21, 1961 |
| 2,997,721 | Hopfeld | Aug. 29, 1961 |